(12) United States Patent
Brzozowski et al.

(10) Patent No.: US 8,332,392 B2
(45) Date of Patent: Dec. 11, 2012

(54) SELECTION OF ITEMS FROM A FEED OF INFORMATION

(75) Inventors: Mike Brzozowski, Mountain View, CA (US); W. Alex Vorbau, Redwood City, CA (US); Anupriya Ankolekar, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 210 days.

(21) Appl. No.: 12/827,152

(22) Filed: Jun. 30, 2010

(65) Prior Publication Data

US 2012/0005203 A1 Jan. 5, 2012

(51) Int. Cl.
G06F 17/30 (2006.01)
(52) U.S. Cl. .................... 707/722; 707/730; 707/751
(58) Field of Classification Search .............. 707/722, 707/730, 751
See application file for complete search history.

(56) References Cited

U.S. PATENT DOCUMENTS

| | | | |
|---|---|---|---|
| 7,669,123 B2 | 2/2010 | Zuckerberg et al. | |
| 7,860,898 B1* | 12/2010 | Moranta et al. | 707/803 |
| 7,865,830 B2* | 1/2011 | Kim et al. | 715/713 |
| 8,019,810 B2* | 9/2011 | Read | 709/203 |
| 8,266,210 B2* | 9/2012 | Belinsky et al. | 709/204 |
| 2008/0040474 A1 | 2/2008 | Zuckerberg et al. | |
| 2008/0040475 A1 | 2/2008 | Bosworth et al. | |
| 2009/0209286 A1 | 8/2009 | Bentley et al. | |
| 2009/0300122 A1* | 12/2009 | Freer | 709/206 |
| 2010/0153646 A1* | 6/2010 | Chen et al. | 711/122 |
| 2011/0029636 A1* | 2/2011 | Smyth et al. | 709/217 |
| 2011/0131283 A1* | 6/2011 | Canning et al. | 709/206 |
| 2011/0179020 A1* | 7/2011 | Ozzie et al. | 707/723 |
| 2011/0191372 A1* | 8/2011 | Kaushansky et al. | 707/776 |
| 2011/0238762 A1* | 9/2011 | Soni et al. | 709/206 |
| 2011/0238763 A1* | 9/2011 | Shin et al. | 709/206 |
| 2011/0320533 A1* | 12/2011 | Belinsky et al. | 709/203 |
| 2012/0150772 A1* | 6/2012 | Paek et al. | 706/12 |

OTHER PUBLICATIONS

"Filter Your Social Network Noise." Scott Bishop. Feb. 9, 2010. Available at http://realtimemarketer.com/social-media-marketing-filter-your-social-media-noise/.

"Too Many Social Network Updates? Two Tools for Filtering the Nobodies." Chris Dannen. May 27, 2009. Available at http://www.fastcompany.com/blog/chris-dannen/techwatch/too-many-status-updates-two-tools-filter-nobodies.

"How Do I Filter Out Status Updates on Facebook?" Available at http://www.askdavetaylor.com/how_to_screen_filter_out_facebook_status_updates.html, Jun. 25, 2010.

* cited by examiner

Primary Examiner — Debbie Le
(74) Attorney, Agent, or Firm — Scott A. Pojunas

(57) ABSTRACT

Example implementations disclosed herein relate to selection of a subset of items included in a feed of information that are perceived to be of interest to a particular user. In some implementations, a feed of information that includes a number of posted items is accessed. In addition, in some implementations, a subset of items perceived to be of interest to a particular user is selected from the feed of information based on a predicted value of each item to the particular user and to a plurality of users of an application used to access the items.

17 Claims, 6 Drawing Sheets

1

SELECTION OF ITEMS FROM A FEED OF INFORMATION

BACKGROUND

Given the sheer amount of information available on the World Wide Web and the ease with which this information can be obtained, many users suffer from what can be described as information overload. A typical user may access the web to read news, stay in touch with friends, track his or her investments, and perform numerous other tasks. With each source of information including a large number of items, it has become increasingly difficult and time consuming for users to locate information that is useful, important, or otherwise of interest.

BRIEF DESCRIPTION OF THE DRAWINGS

The following detailed description references the drawings, wherein.

DETAILED DESCRIPTION

As described above, it has become increasingly difficult and time consuming for a user to view information that is useful, important, or otherwise of interest when accessing a feed of information. To address this issue, example implementations disclosed herein process a feed of information to generate a personalized feed that contains items likely to be of interest to a given user.

In particular, in some implementations, a computing device accesses a feed of information that includes a number of posted items accessible to the user via an application. In some implementations, the device may then select a subset of items perceived to be of interest to the user. In selecting the items to be included in the subset, the computing device may consider a local value of each item to the user and a global value of each item to other users of the application, considering a number of possible factors in determining these values.

In this manner, various implementations disclosed herein may filter items from a feed of information automatically, thereby relieving the user of the burden of sifting through the feed to obtain information that is useful or of interest. In particular, by considering the global value of each item to a number of users, various implementations include items that are popular among a group of users. Similarly, by also considering the local value of the item to the user, various implementations ensure that the items are still customized for the particular user. Additional implementations and applications of such implementations will be apparent to those of skill in the art upon reading and understanding the following description.

In the description that follows, reference is made to the term, "machine-readable storage medium." As used herein, the term "machine-readable storage medium" refers to any electronic, magnetic, optical, or other physical storage device that contains or stores executable instructions or other data (e.g., a hard disk drive, flash memory, etc.).

Figure 1:
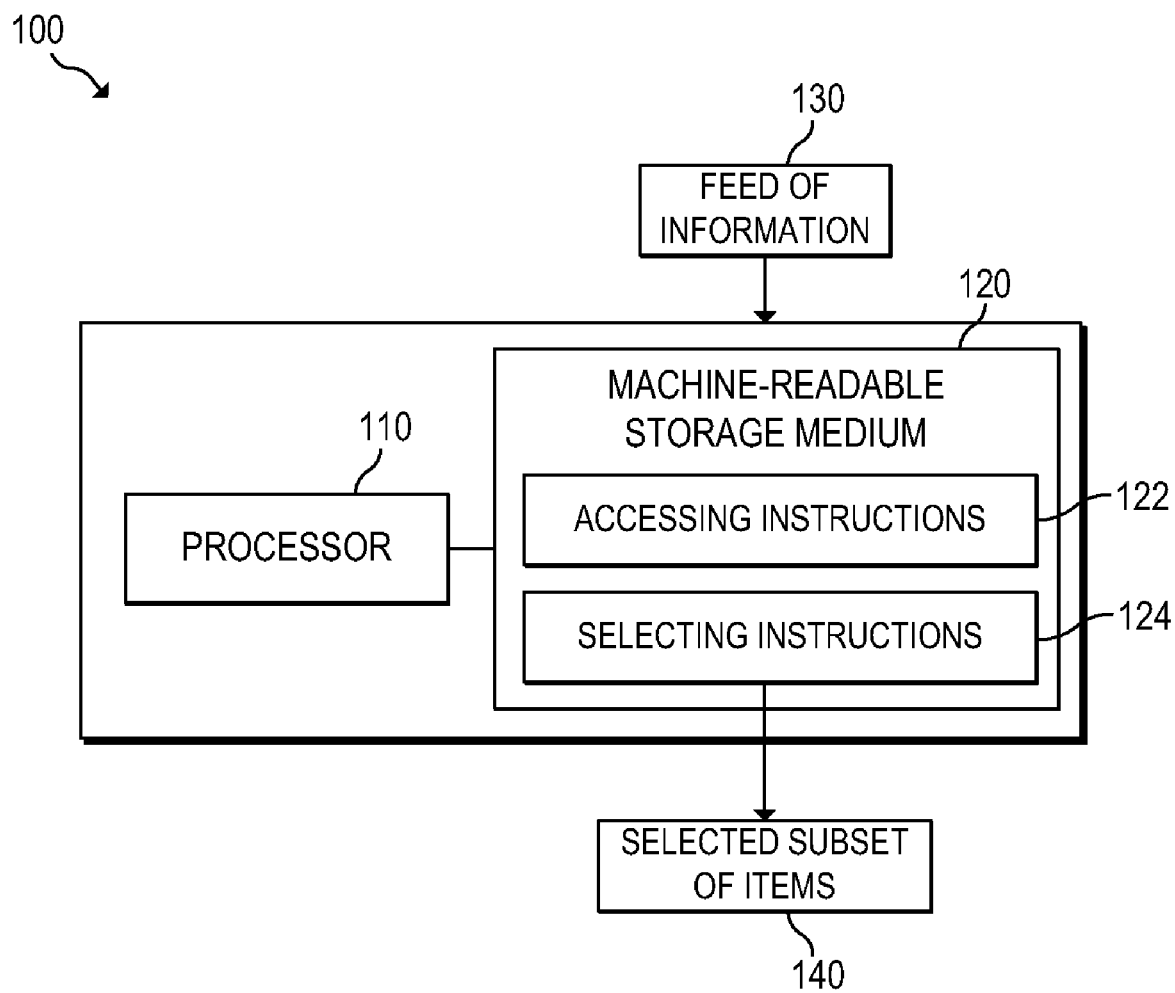
FIG. 1 is a block diagram of an example computing device for selecting, from a feed of information, a subset of items perceived as likely to be of interest to a particular user.

Referring now to the drawings, FIG. 1 is a block diagram of an example computing device 100 for selecting, from a feed of information 130, a subset of items 140 perceived to be of interest to a particular user. Computing device 100 may be, for example, a web server or other server, a desktop computer, a laptop computer, a handheld computing device, a mobile phone, or the like. In the implementation of FIG. 1, computing device 100 includes a processor 110 and a machine-readable storage medium 120.

Processor 110 may be a central processing unit (CPU), a semiconductor-based microprocessor, or any other hardware device suitable for retrieval and execution of instructions stored in machine-readable storage medium 120. In particular, processor 110 may fetch, decode, and execute instructions 122, 124 to implement the functionality described in detail below.

Machine-readable storage medium 120 may be encoded with executable instructions 122, 124 for accessing a feed of information 130 and selecting, from the feed, a subset of items 140 perceived to be of interest to a particular user. In some implementations, instructions 122, 124 may be executed on a server, such that the subset of items 140 is selected and transmitted to the client computing device of a requesting user. Alternatively, in other implementations, instructions 122, 124 may be executed on the client computing device. In such implementations, the client computing device may receive the entire feed of information 130 and select the subset of items 140 from the feed for output to the user.

Regardless of the particular implementation, machine-readable storage medium 120 may include accessing instructions 122, which may access a feed of information 130 that includes a plurality of posted items accessible to a user via an application. Accessing instructions 122 may be triggered initially upon receipt of a request from a user for a personalized feed of information or, alternatively, when computing device 100 is to prepare a personalized feed in advance. In response, accessing instructions 122 may access the feed of information 130 using a number of mechanisms. As one example, accessing instructions 122 may directly access a database or other storage construct to obtain the items included in the feed of information 130. As another example, accessing instructions 122 may execute an Application Programming Interface (API) function that allows for access to the feed of information 130 by an external entity, such as device 100. Other suitable mechanisms for accessing the feed 130 will be apparent to those of skill in the art.

Feed of information 130 may be any source of information that includes a number of separate items of information. For example, feed of information 130 may be a collection of items posted to a social networking site. In such implementations, the feed of information 130 may contain posts (e.g., posts on a blog) by the user's friends or posts by other users that the user has permission to access. As another example, the feed of information 130 may be a collection of news items (e.g., news articles and/or links to new articles), messages generated by an application (e.g., an IT monitoring application), items posted in a message board, files (e.g., documents, audio files, or video files and/or links to documents, audio files, or video files), or any other collection of information. In some implementations, the feed of information 130 may itself include items from a combination of feeds, which accessing instructions 122 may access individually or through a central source that aggregates the feeds.

As mentioned above, each feed of information 130 may include a number of posted items. The feed of information 130 may be, for example, a Really Simple Syndication (RSS) feed of audio, video, and/or text, a feed of a social networking application, a news feed, and the like. A posted item in the feed 130 may be any item of information authored by a user or an application. For example, in the context of a social networking site, each posted item may be a status update, a photo, a link to an external site, an update generated by an application (e.g., a social networking game), and the like. Similarly, the posted item may be a news or opinion article, a sports score, or a stock quote, to name a few examples. Other examples of posted items will be apparent to those of skill in the art.

Each of the items included in the feed of information 130 may be accessible to users via an application. The application may be, for example, a web-based application, such as a social networking application, a news feed, or another similar application accessible using a web browser. Alternatively, the application may be a dedicated application running on a computing device, such as a mobile phone or personal computer, or may instead be a component of the operating system of the user's device.

Machine-readable storage medium 120 may also include selecting instructions 124, which may select, from the accessed feed of information 130, a subset of items 140 perceived to be of interest to a particular user. In selecting the subset of items 140, selecting instructions 124 may consider at least a predicted value of each item to the particular user and a global value of each item to a plurality of users of the application.

In determining the predicted value of each item to the user (i.e., the local value), selecting instructions 124 may consider a number of factors. For example, selecting instructions 124 may consider a number of past endorsements of a source of the item by the user. The source of an item may be, for example, a particular application, website, or type of content. For example, the source of an item may be a particular source of news (e.g., the New York Times), a particular application (e.g., a social game in a social networking site), a category of post (e.g., a status update or photo posting), a website linked to in the posted item, and the like. An endorsement of a particular source may be, for example, a selection of an item from the source, a reply to an item from the source, a forwarding of an item from the source, a quoting of an item from the source, and an expression of approval of an item from the source. Selecting instructions 124 may, for example, determine a total number of endorsements of the source in the past or, alternatively, calculate a reputation score representing a weighted value of the user's interest in the source compared to other sources. An example of a reputation calculation used in some implementations is described in detail below in connection with FIG. 2.

In determining the local value of each item, selecting instructions 124 may also consider the number of past endorsements of an author of the item by the user. The author of an item may be, for example, a particular user or an application that posted the item. Selecting instructions 124 may determine the local value of the author in a manner similar to determining the local value of the source of the item. For example, selecting instructions 124 may determine a total number of endorsements by the user of past posts of the author or may calculate a reputation score representing a weighted value of the user's interest in the author compared to other authors.

As mentioned above, in determining the value of each item, selecting instructions 124 may consider the global value of each item, which may also be based on a number of factors. In particular, rather than limiting the item value determination to only endorsements by the particular user, selecting instructions 124 may also consider endorsements of other users. In some implementations, the global value of an item may be determined with reference to all users of the particular application. Alternatively, the global value of an item may be determined with reference to a trusted group of peers of the user. For example, in an application with social networking capability, the global value of each item could be determined with reference to only friends of the user (e.g., individuals whom the user has designated as being trusted or otherwise known by the user) or another group of users with a predetermined relationship with the user (e.g., family, classmates, colleagues, etc.).

As an example of one factor used in determining the global value of an item, selecting instructions 124 may consider the total number of endorsements of the item by the plurality of users in the selected group. This number may represent the interest of all of these users in the particular posted item. As an example of another factor, selecting instructions 124 may consider a number of past endorsements by the plurality of users of the author of the item. For example, selecting instructions 124 may determine a total number of endorsements by all users of past posts of the author or calculate a reputation score representing a weighted value of the users' interest in the author compared to other authors. Selecting instructions 124 may similarly consider a number of past endorsements by the plurality of users of the source of the item.

After determining the local and global value of each item, selecting instructions 124 may use the determined values to select a number of posted items that are perceived to be of interest to the particular user. As one example, selecting instructions 124 may sort the items according to their local and global values using a tiered approach, such that a first global or local value determines the initial order, with additional values used to break ties. As a specific example of such an implementation, selecting instructions 124 may first order the items using the local value and break any ties using the global value.

As another example of a selection methodology, when the local and global values are calculated as numerical values, selecting instructions 124 may determine a total score for each post and select a number of highest-ranked posts from the feed of information 130. In some implementations, selecting instructions 124 may weigh the local and global values differently and, in addition, may weigh the constituent factors considered in each of the values differently. Further details for a weighting process used in some implementations are provided in detail below in connection with FIG. 2.

After selecting a group of items, selecting instructions 124 may further refine the selected items based on a limit on a number of posts and/or a specified time window. Alternatively, the refinement of the items may be performed in advance by limiting the items for which the local and global values are determined. Regardless of the particular implementation, selecting instructions 124 may, for example, select only a predetermined number of items based on a predetermined maximum number or, alternatively, based on a number of items specified by a user. Selecting instructions 124 may also limit the posts to a particular time interval based on a time of posting associated with each item. For example, selecting instructions 124 may select only items within a particular time window specified by a user (e.g., the last 24 hours, the last week, etc.) or, alternatively, select only items posted since the user last accessed the feed of information 130.

After applying the local and global value determinations and filtering the selected items as necessary, selecting instructions 124 may output the selected subset of items 140. In particular, when computing device 100 is a server, selecting instructions 124 may transmit the selected subset of items 140 to the particular user's computing device. Alternatively, when computing device 100 is the user's device, selecting instructions 124 may provide the subset 140 to a set of instructions that output the selected subset of items 140 to the user.

Figure 2:
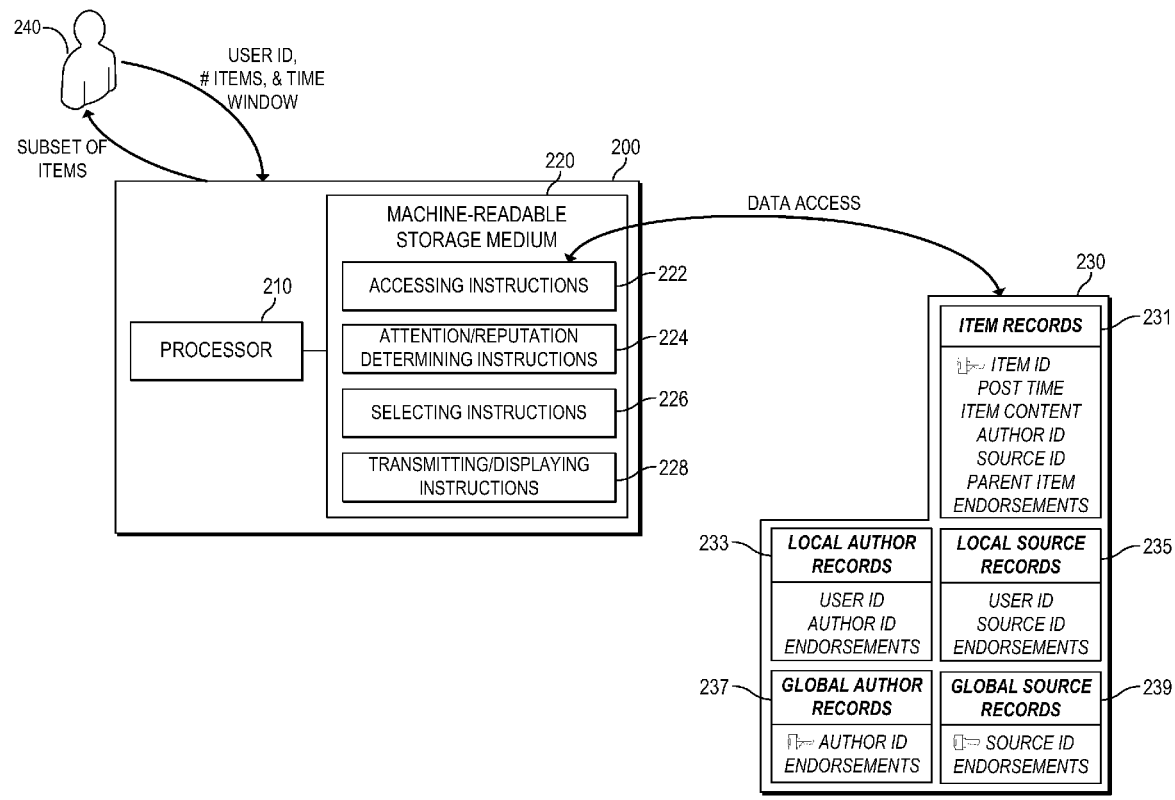
FIG. 2 is a block diagram of an example computing device for selecting a subset of items most likely to be of interest to a particular user based on access to a database including the items and related records.

FIG. 2 is a block diagram of an example computing device 200 for selecting a subset of items perceived to be of interest to a particular user 240 based on access to a database 230 including the items and related records. Computing device 200 may be, for example, a web server or other server, a desktop computer, a laptop computer, a handheld computing device, a mobile phone, or the like. In the implementation of FIG. 2, computing device 200 includes a processor 210 and a machine-readable storage medium 220, and has access to a database 230.

As with processor 110 of FIG. 1, processor 210 may be a central processing unit (CPU), a semiconductor-based microprocessor, or any other hardware device suitable for retrieval and execution of instructions stored in machine-readable storage medium 220. Machine-readable storage medium 220 may be encoded with executable instructions 222, 224, 226, 228 for selecting, from a feed of information, a subset of items perceived to be of interest to a user 240. As with instructions 122, 124 of FIG. 1, instructions 222, 224, 226, 228 may select and transmit the subset of items to a client when executing in a server or, alternatively, may select and output the items when executing in a device belonging to user 240.

Accessing instructions 222 may operate similarly to accessing instructions 122 of FIG. 1. In particular, upon receipt of a request for a personalized feed of information or when preparing a personalized feed in advance, accessing instructions 222 may access a feed of information that includes a plurality of posted items accessible to a user 240. In the implementation of FIG. 2, accessing instructions 222 may access the feed of information from a number of tables 231, 233, 235, 237, 239 in database 230. In particular, each record in item records 231 may correspond to a posted item, while tables 233, 235, 237, 239 may contain data that may be used in determining level of attention and/or reputation values.

Attention/reputation determining instructions 224 may determine a number of level of attention values for each item. As described below, these values may then be used by selecting instructions 226 in choosing the items perceived to be of interest to the particular user 240. As an example of one level of attention value, determining instructions 224 may determine a level of attention by a plurality of users to each item. As detailed above, the plurality of users may be all users of the application or a trusted group of peers of the user (e.g., all users with a predetermined relationship with the user). The level of attention may be based on, for example, a total number of endorsements of each item by the plurality of users. With reference to database 230, determining instructions 224 may determine this attention value by accessing the "Endorsements" field in item records 231 using a unique item identifier (ID) as a key.

In addition to the level of attention by all users to each item, determining instructions 234 may also determine a global level of attention value for the author of the item and/or the source of the item, considering the attention of all users in the selected group of users. Thus, with reference to database 230, determining instructions 234 may determine the global author attention value by identifying the author of the posted item and obtaining the total number of endorsements by querying global author records 237 using the author identifier. Similarly, determining instructions 234 may determine the global source attention value by identifying the source of the posted item and obtaining the total number of endorsements by querying global source records 239 using the source identifier. As an alternative to accessing separately-stored global author records 237 and global source records 239, determining instructions 224 may instead traverse all user identifiers in local author records 233 or local source records 235 to determine a sum of the endorsements for each author or source.

Determining instructions 234 may also determine a local level of attention value for the author of the item and/or the source of the item considering only attention of the requesting user 240. With reference to database 230, determining instructions 234 may determine the total number of endorsements of a particular author by the user 240 by querying local author records 233 using the user's identifier and the identifier of the author of the posted item. Similarly, determining instructions 234 may determine the total number of author endorsements by the user 240 by querying local source records 235 using the user's identifier and the identifier of the source of the posted item.

As described above, each set of records 231, 233, 235, 237, 239 may include an endorsement field. In some implementations, a server-side application may update the endorsement field for each record as appropriate upon an endorsement by a user 240. For example, when a user 240 selects an item, replies to or forwards an item, quotes an item, or expresses approval of an item, the application may increment the endorsements field in item records 231 for the particular item identifier. The application may also appropriately update the endorsements for the user 240 in local records 233, 235 and global records 237, 239. In some implementations, the endorsement may be weighted according to a predetermined level of effort assigned to each type of endorsement. For example, a click or selection of an item may receive 1 endorsement point, an expression of approval may receive 2, and a reply to or forwarding of an item may receive 3. Other suitable weights for each type of endorsement will be apparent.

In some implementations, attention/reputation determining instructions 224 may utilize the determined levels of attention to calculate a number of reputation values. In particular, in some implementations, determining instructions 224 may calculate up to four different reputation values and pass these values to selecting instructions 226 for use in selecting the subset of items most likely to be of interest to the requesting user 240. These reputation values may be calculated and stored in database 230 in advance or, alternatively, may be calculated in real-time upon receipt of a request from a user 240. In addition to the following description of each reputation value, an example method for calculating a reputation value is described in detail below in connection with FIG. 5A.

A first reputation value may be a local author reputation value, which may value each author for the requesting user 240. In determining this reputation value, determining instructions 224 may first determine a total number of endorsements by user 240 for all authors by adding up each endorsement value in local author records 233. Determining instructions 224 may then determine an expected number of endorsements for each author by accessing item records 231 to determine a percentage of the total posted items attributable to the author and multiplying this percentage by the total number of author endorsements by user 240. Finally, determining instructions 224 may compare the actual number of endorsements by user 240 for a particular author to the expected number of endorsements (e.g., by subtracting the expected number from the actual number). In some implementations, determining instructions 224 may then normalize the resulting values to be real numbers in the range of −1 to 1.

As a specific example, suppose that there are 100 posted items in item records 231 attributable to 10 different authors. Further suppose that user 240 has given a total of 20 endorsements to 5 different authors, including 5 endorsements to Author 1 and 1 endorsement to Author 2. If Author 1 has posted a total of 10 items, then, assuming an even distribution of endorsements per post, it would be expected that user 240 would have endorsed posts by Author 1 a total of 2 times (i.e., 10 percent of the total author endorsements). If Author 2 has posted a total of 50 items, then it would be similarly expected that user 240 would have endorsed posts by Author 2 a total of 10 times (i.e., half of the total author endorsements). So, in this example, the reputation score for Author 1 may be the actual number of endorsements (5) minus the expected number of endorsements (2), for a reputation score of 3. Similarly, the reputation score for Author 2 may be the actual number of endorsements (1) minus the expected number of endorsements (10), for a reputation score of −9. These scores would indicate that, in general, user 240 prefers posts by Author 1 to those of Author 2.

In addition to the local author reputation value, determining instructions 224 may also determine a local source reputation value for each source using local source records 235, a global author reputation value for each author using global author records 237, and a global source reputation value for each source using global source records 239. For these reputation values, determining instructions 224 may consider only endorsements of user 240 in calculating the local source reputation value, while using endorsements of all users in a selected group in calculating the global author reputation value and the global source reputation value. The calculation of each of these values may be performed in a manner similar to the procedure described above in connection with the local author reputation value.

Based on the level of attention and/or reputation values, selecting instructions 226 may select a subset of items most likely to be of interest to the requesting user. As one example, described in further detail above in connection with selecting instructions 124 of FIG. 1, selecting instructions 226 may use a tiered sorting approach. As another example, selecting instructions 226 may determine a total of each of the level of attention or reputation values for each item and select a predetermined number of items with the highest total. In some implementations, selecting instructions 226 may assign a weight to each of the levels of attention or reputation values and determine a total for each item as a linear combination of the values.

As with selecting instructions 124 of FIG. 1, selecting instructions 226 may further refine the selected items based on a limit on a number of posts and/or a specified time window. In particular, selecting instructions 226 may select, from the highest ranked items, a number of items with a time of posting in a particular time range. Alternatively, selecting instructions 226 may select a number of items since the user last accessed the feed of information. In addition to time constraints, selecting instructions 226 may limit the total number of posted items in the subset based on a predetermined number which may be specified by the user in some implementations.

After selection of a subset of items by selecting instructions 226, transmitting/displaying instructions 228 may receive the selected subset of items and take an appropriate action. In particular, when computing device 200 is a server, instructions 228 may transmit the selected subset of items to the requesting user's computing device. Alternatively, when computing device 200 is the user's device, instructions 228 may output the subset to the user 240 via a display.

Database 230 may be an organized collection of data containing posted items included in the feed of information. The data included in database 230 may be maintained in one or more storage devices accessible to computing device 200. As detailed above, computing device 200 may directly access database 230 or, alternatively, access database 230 using an application API defined by the application that provides access to the feed of information. Thus, database 230 may be maintained locally to computing device 200 or may be remotely located. It should be noted that the database schema described in detail below may be modified to represent the data in a different manner by, for example, combining one or more tables or splitting the data into additional tables. Other suitable arrangements for database 230 will be apparent to those of skill in the art.

Item records 231 may store data for each of the posted items included in the feed of information. Each entry in item records 231 may include an item identifier, which may operate as a key to uniquely identify the entries. Each entry in item records 231 may also include a time of posting, item content (e.g., a URL, text, photos, etc.), an identifier of the author, an identifier of the source, the item identifier of a parent item if the current item is a reply, and a count indicating the total number of endorsements of the item by all users.

Local author records 233 may store author endorsement data for each user. In particular, each entry in local author records 233 may include a user identifier, an author identifier, and a number of endorsements of the identified author by the identified user. Local source records 235 may similarly store source endorsement data for each user. In particular, each entry in local source records 235 may include a user identifier, a source identifier, and a number of endorsements of the identified source by the identified user.

Global author records 237 may store a total number of endorsements of each author. In particular, each entry in global author records 237 may include an author identifier and a total number of endorsements of the identified author by all users. Global source records 239 may similarly store a total number of endorsements of each source. In particular, each entry in global source records 239 may include a source identifier and a total number of endorsements of the identified source by all users.

User 240 may be any user with access to the feed of information. As illustrated, user 240 may submit a request for a personalized feed of information. This request may include one or more of the user's identifier (e.g., a user name or email address), a desired number of items, and a desired time window. In response to such a request, computing device 200 may select a subset of items perceived to be of interest to user 240 and transmit the selected items to the user's computing device or output the items to user 240.

Figure 3:
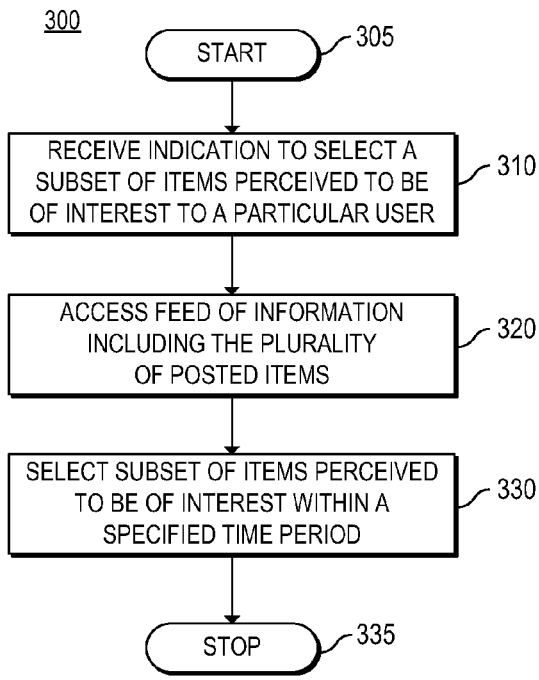
FIG. 3 is a flowchart of an example method for selecting, from a feed of information, a subset of items most likely to be of interest to a user.

FIG. 3 is a flowchart of an example method 300 for selecting, from a feed of information, a subset of items perceived to be of interest to a user. Although execution of method 300 is described below with reference to computing device 100, other suitable components for execution of method 300 will be apparent to those of skill in the art. Method 300 may be implemented in the form of executable instructions stored on a machine-readable storage medium, such as machine-readable storage medium 120 of FIG. 1.

Method 300 may start in block 305 and proceed to block 310, where computing device 100 may receive an indication to select a subset of items perceived to be of interest to a particular user from a plurality of posted items. Each of the items may be accessible to a plurality of users via an application, which may be a web-based application (e.g., a social networking site, a message board, a news website, etc.) or any other application that provides access to a feed of information. In some implementations, the received indication may specify a time period from which the items are to be selected. This time period may be specified by the user or, alternatively, may be the time period since the user has last accessed the feed of information.

Method 300 may then proceed to block 320, where computing device 100 may access a feed of information including the plurality of posted items. Computing device 100 may, for example, directly access a database or other storage construct to obtain items included in the feed of information. As another example, computing device 100 may execute an Application Programming Interface (API) function that allows for access to the feed of information.

After computing device 100 accesses the items in the feed of information, method 300 may proceed to block 330, where computing device 100 may select a subset of items most likely to be of interest to the particular user. In identifying these items, computing device 100 may consider, for example, a predicted value of each item to the requesting user (i.e., a local value) and a global value of each item to a plurality of users of the application. Each of these values may be based on a number of local or global levels of attention and/or local or global reputation values. Furthermore, computing device 100 may restrict the selected items to those items with a time of posting within the time period specified in block 310. Example procedures for selecting the items perceived to be of interest are described in detail above in connection with selecting instructions 124 of FIG. 1. After selecting the subset of items perceived to be of interest to the user within the specified time period, method 300 may then proceed to block 335, where method 300 may stop.

Figure 4:
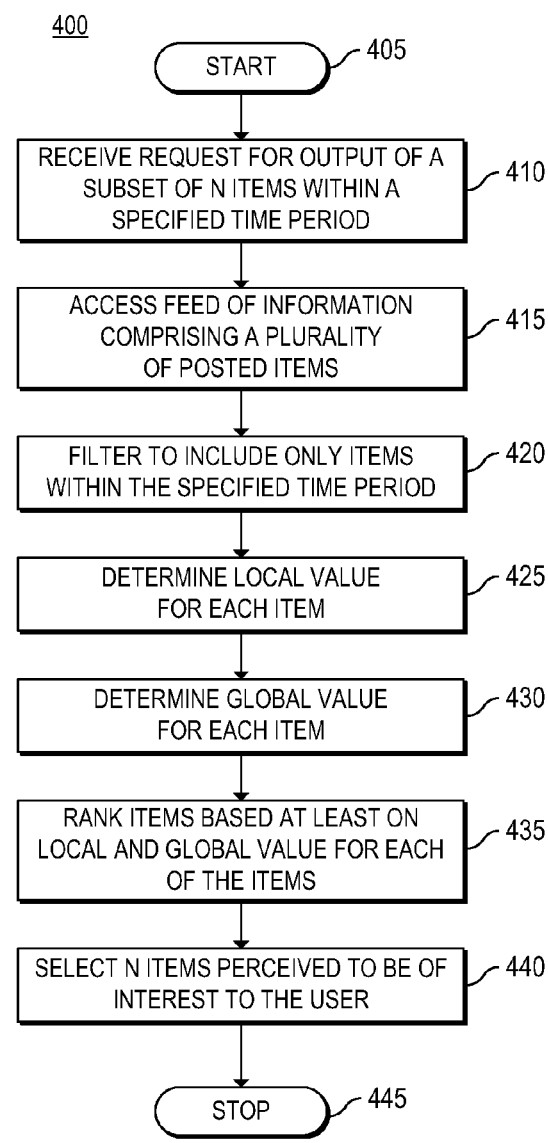
FIG. 4 is a flowchart of an example method for selecting, from a feed of information, a subset of items most likely to be of interest to a user based on a determined local and global value for each item.

FIG. 4 is a flowchart of an example method 400 for selecting, from a feed of information, a subset of items perceived to be of interest to a user based on a determined local and global value for each item. Although execution of method 400 is described below with reference to computing device 200, other suitable components for execution of method 400 will be apparent to those of skill in the art. Method 400 may be implemented in the form of executable instructions stored on a machine-readable storage medium, such as machine-readable storage medium 220 of FIG. 2.

Method 400 may start in block 405 and proceed to block 410, where computing device 200 may receive a request from a user to output a subset of N items within a specified time period. This request may be received from a user via, for example, a web browser, a mobile phone application, an application running on a desktop or laptop computing device, or any other application that may transmit requests to computing device 200.

After receipt of the request by computing device 200, method 400 may proceed to block 415, where computing device 200 may access a feed of information comprising a plurality of posted items. Computing device 200 may, for example, directly access a database or other storage construct to obtain items included in the feed of information. As another example, computing device 200 may execute an Application Programming Interface (API) function that allows for access to the feed of information.

After computing device 200 accesses the feed of information, method 400 may then proceed to block 420, where computing device 200 may filter the feed of information to include only items within the specified time period. As an example, computing device 200 may access the time of posting associated with each item and discard any items with a time of posting outside of the specified time period. As an alternative to receiving and then filtering the items, computing device 200 may provide the specified time period as a parameter when accessing the feed of information.

After computing device 200 filters out items that are not in the specified time period, method 400 may proceed to block 425, where computing device 200 may determine the local value for each item. In some implementations, computing device 200 may determine the local value of each item based on levels of attention of the requesting user. For example, computing device 200 may determine the local level of attention of the user to the author of the item and/or the source of the item. These levels of attention may be, for example, a total number of endorsements of a particular author or source by the requesting user. In addition or as an alternative, computing device 200 may determine one or more local reputation values, which may rate each author and/or source with respect to one another based on the user's endorsements. An example of a reputation calculation is described in detail below in connection with FIG. 5A.

After computing device 200 determines the local value for each item, method 400 may proceed to block 430, where computing device 200 may determine the global value for each item. In some implementations, computing device 200 may determine the global value of each item based on levels of attention of all users in a selected group. For example, computing device 200 may determine the global level of attention of users to the author of the item and/or the source of the item. These levels of attention may be, for example, a total number of endorsements of a particular author or source by all users. In addition or as an alternative, computing device 200 may determine one or more global reputation values, which may rate each author and/or source with respect to one another based on all users' endorsements. An example of a reputation calculation is described in detail below in connection with FIG. 5A.

After computing device 200 determines the local and global reputation for each item, method 400 may proceed to block 435, where computing device 200 may rank the items based on the local and global values for each of the items. An example process for ranking the items is described in detail below in connection with FIG. 5B.

Finally, method 400 may proceed to block 440, where computing device 200 may select the N items perceived as being most likely to be of interest to the user from the ranked list of items obtained in block 435. An example process for selecting these items is described in detail below in connection with FIG. 5C. After selecting the items perceived as being most likely to be of interest to the requesting user, method 400 may proceed to block 445, where method 400 may stop.

Figure 5A:
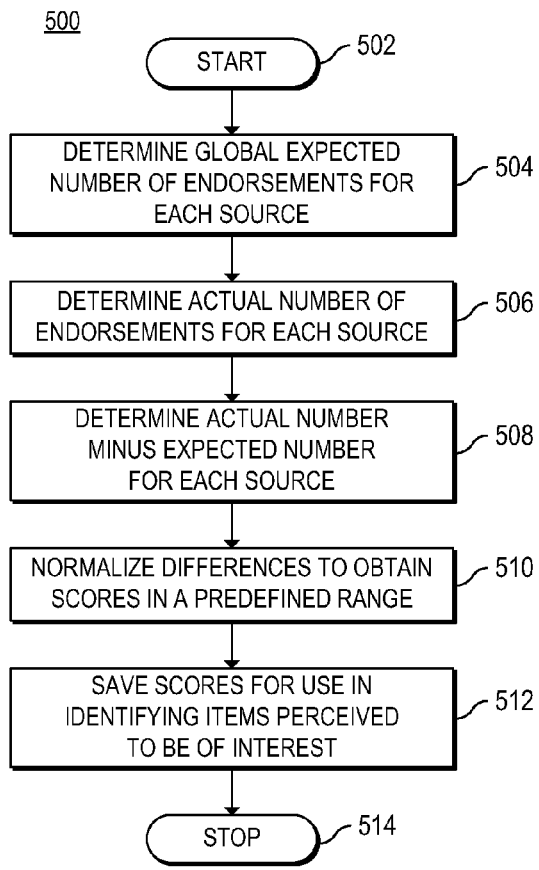
FIG. 5A is a flowchart of an example method for determining a global reputation for a source of a particular item.

FIG. 5A is a flowchart of an example method 500 for determining a global reputation for a source of a particular item. Although execution of method 500 is described below with reference to computing device 200, other suitable components for execution of method 500 will be apparent to those of skill in the art. Method 500 may be implemented in the form of executable instructions stored on a machine-readable storage medium, such as machine-readable storage medium 220 of FIG. 2.

As described in detail below, method 500 relates to calculation of a global source reputation value. The method described below may be adapted to the calculation of a local source reputation value, a local author reputation value, and a global author reputation value. In addition, it should be noted that the procedure in method 500 may, in some implementations, be performed on a periodic basis, such that the reputation values may be stored for quick access as necessary. In such implementations, method 500 may be periodically executed by the server that maintains the item records.

Method 500 may start in block 502 and proceed to block 504, where computing device 200 may determine the global expected number of endorsements for each source. In other words, computing device 200 may calculate a value representing the number of endorsements that would be received for each source assuming an even distribution of endorsements per post. Thus, computing device 200 may first determine the total number of posts and the total number of endorsements for all of the sources by the users in the group for which the global value is to be calculated. Then, for each source, computing device 200 may determine the percentage of the total posts from that source and multiply that percentage by the total number of endorsements. The resulting numbers may represent the expected number of endorsements for each of the sources by the users in the selected group.

Method 500 may then proceed to block 506, where computing device 200 may determine the actual number of endorsements for each source by, for example, querying one or more tables maintaining this information. Next, in block 508, computing device 200 may, for each source, subtract the expected number of endorsements from the actual number of endorsements to obtain an initial reputation score.

Method 500 may then proceed to block 510, where, in some implementations, computing device 200 may normalize the difference values obtained in block 508. As an example of one normalization procedure, computing device 200 may first determine the sum of the absolute value of all sources. Computing device 200 may then divide each difference value by the resulting sum to obtain a normalized reputation score between −1 and 1. Method 500 may then proceed to block 512, where computing device 200 may store each calculated reputation value for future access when selecting a subset of items. Finally, method 500 may proceed to block 514, where method 500 may stop.

Figure 5B:
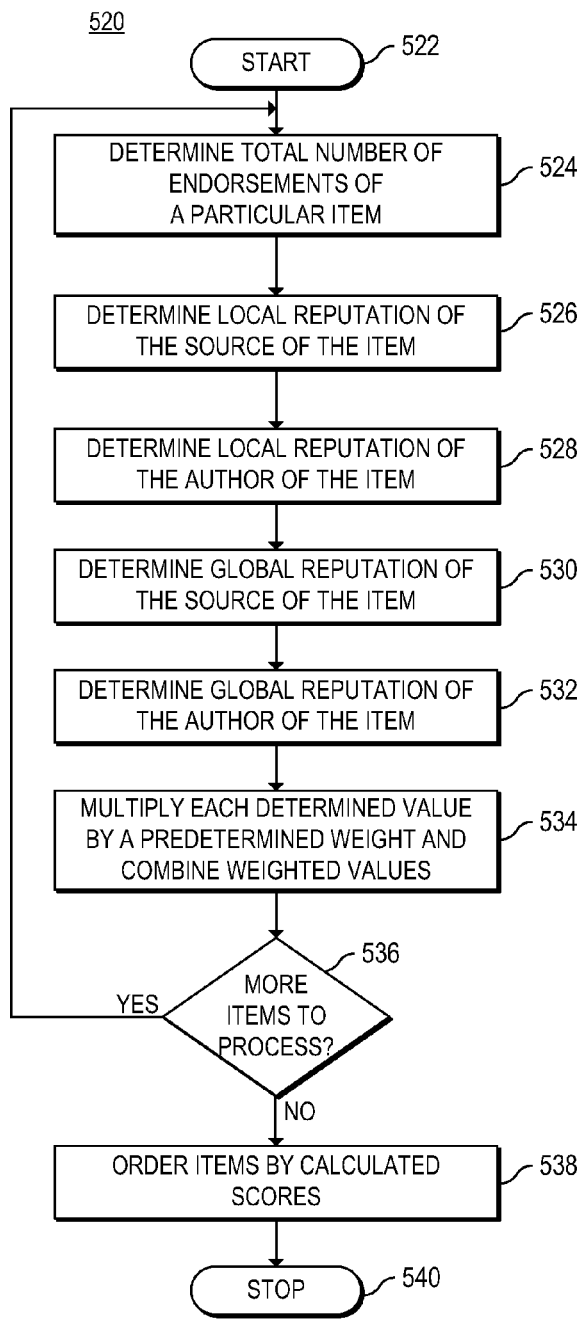
FIG. 5B is a flowchart of an example method for ranking a set of items based on a local and global reputation for each of the items.

FIG. 5B is a flowchart of an example method 520 for ranking a set of items based on a local and global reputation for each of the items. Although execution of method 520 is described below with reference to computing device 200, other suitable components for execution of method 520 will be apparent to those of skill in the art. Method 520 may be implemented in the form of executable instructions stored on a machine-readable storage medium, such as machine-readable storage medium 220 of FIG. 2.

Method 520 may be an example implementation of block 435 of FIG. 4. Accordingly, method 520 may be a procedure for ranking a number of items based on their local and global reputation values. Method 520 may start in block 522 and proceed to block 524, where computing device 200 may determine the total number of endorsements by all users of a first selected item. In blocks 526, 528, 530, and 532, computing device 200 may determine the local source reputation, the local author reputation, the global source reputation, and the global author reputation of the item. Computing device 200 may determine these values using the procedure described in detail above in connection with FIG. 5A or, alternatively, may query a location in which these values have been stored.

Method 520 may then proceed to block 534, where computing device 200 may determine a score for the item using a linear combination of weights applied to each of the values. As an example, computing device 200 may access a predetermined set of weights containing a weight for each of the values determined in blocks 524, 526, 528, 530, and 532 and multiply each value by the corresponding weight. Computing device 200 may then determine a score for the item by calculating a sum of each of the weighted values.

After determining a score for the item, method 520 may proceed to block 536, where computing device 200 may determine whether there are additional items to process. If so, method 520 may return to block 524 for processing of the next item. Alternatively, method 520 may proceed to block 538. In block 538, computing device 200 may generate a list of the items ordered by the calculated scores. Method 520 may then proceed to block 540, where method 520 may stop.

Figure 5C:
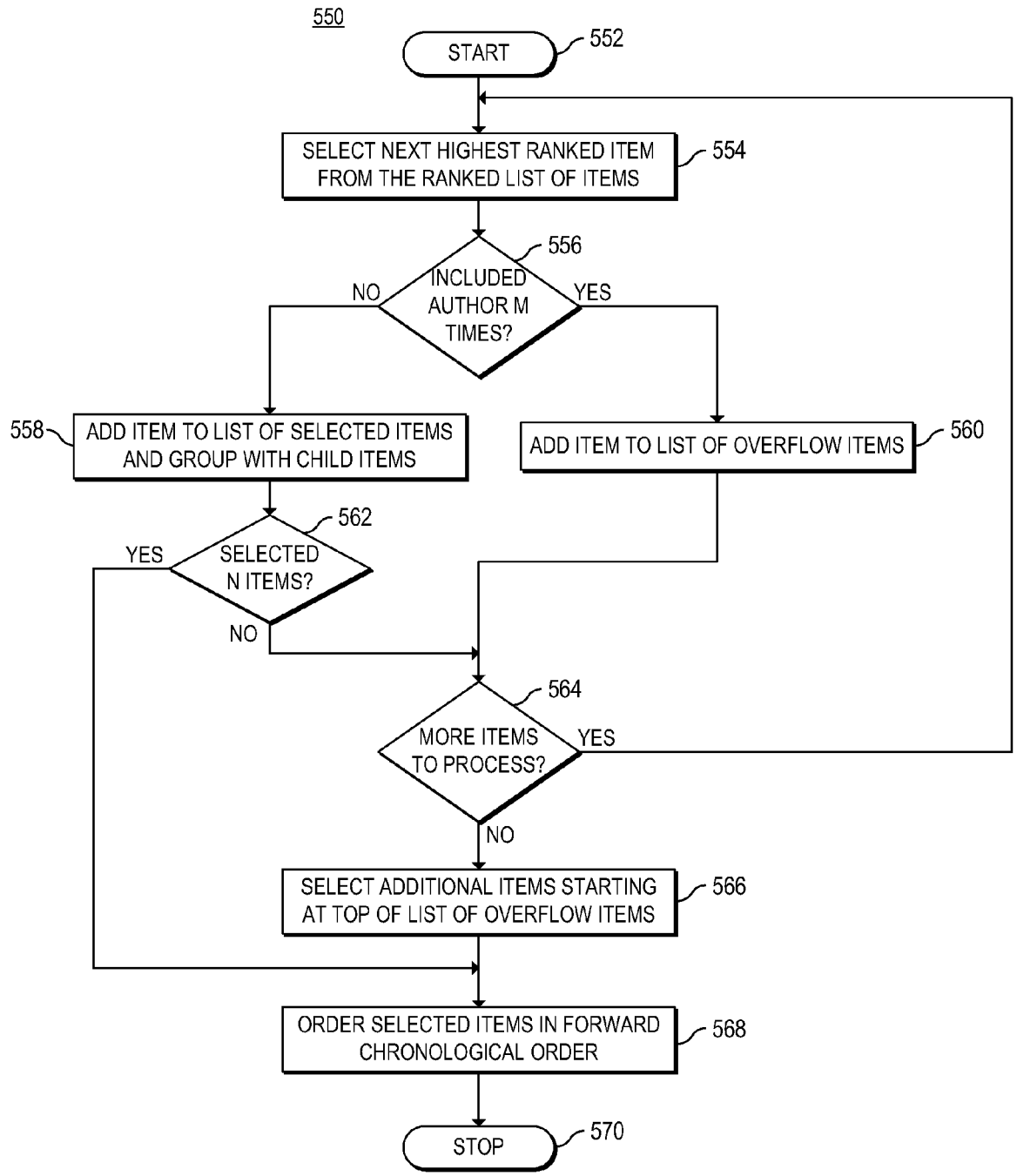
FIG. 5C is a flowchart of an example method for selecting a subset of N items most likely to be of interest to a particular user.

FIG. 5C is a flowchart of an example method 550 for selecting a subset of N items perceived as being most likely to be of interest to a particular user. Although execution of method 550 is described below with reference to computing device 200, other suitable components for execution of method 550 will be apparent to those of skill in the art. Method 550 may be implemented in the form of executable instructions stored on a machine-readable storage medium, such as machine-readable storage medium 220 of FIG. 2.

Method 550 may be an example implementation of block 440 of FIG. 4. Accordingly, method 550 may be a procedure for selecting a group of N items perceived as being most likely to be of interest to a user from a ranked list of items. Method 550 may start in block 552 and proceed to block 554, where computing device 200 may select the next highest ranked item from the ranked list of items.

Method 550 may then proceed to block 556, where computing device 200 may determine whether the author of the selected item has been included in the subset of items a predetermined number of times. This step may thereby ensure that the personalized feed of items is not dominated by posts from a single author.

When computing device 200 determines that the author has been included fewer than the predetermined number of times, method 550 may proceed to block 558, where computing device 200 may add the item to a list of items to be included in the subset. In addition, computing device 200 may locate any child items of the selected item (e.g., replies to the selected item) and group them with the selected item in the subset.

Method 550 may then proceed to block 562, where computing device 200 may determine whether the subset of items now includes N items, where N is the total number of items to be selected. If so, method 550 may proceed to block 568, described in further detail below. If N items have not been selected, method 550 may proceed to block 564, also described in detail below.

Referring again to block 556, when computing device 200 determines that the author has already been included the predetermined number of times, method 550 may proceed to block 560. In block 560, computing device 200 may add the item to a list of overflow items. As described in detail below, this list of items may later be referenced if it is determined that additional posts from the same author are required to obtain the predetermined total number of posts.

Method 550 may then proceed to block 564, where computing device 200 may determine whether there are additional items to process. If so, method 550 may return to block 554 for processing of the next highest ranked item in the ranked list. If there are no additional items to process, method 550 may proceed to block 566.

In block 566, computing device 200 may determine that there are not enough items in the subset of selected items. Accordingly, computing device 200 may add N-X posts from the list of overflow items, where N is the desired total number of posts and X is the number currently included in the subset. Method 550 may then proceed to block 568, where computing device 200 may order the items in forward chronological order (i.e., starting with the oldest item and ending with the newest). In these implementations, the user may therefore access the items perceived as being of interest in the order they were originally posted. Such implementations are useful when, for example, the user is accessing the feed after a passage of a period of time (e.g., after returning from vacation, after a weekend, or since an access earlier in the day).

Method 550 may then proceed to block 570, where method 550 may stop. It should be noted that, in some implementations, method 550 may skip directly to block 570 from block 566. In these implementations, the selected subset of items will be ordered from a highest ranked item to a lowest ranked item.

Figure 6:
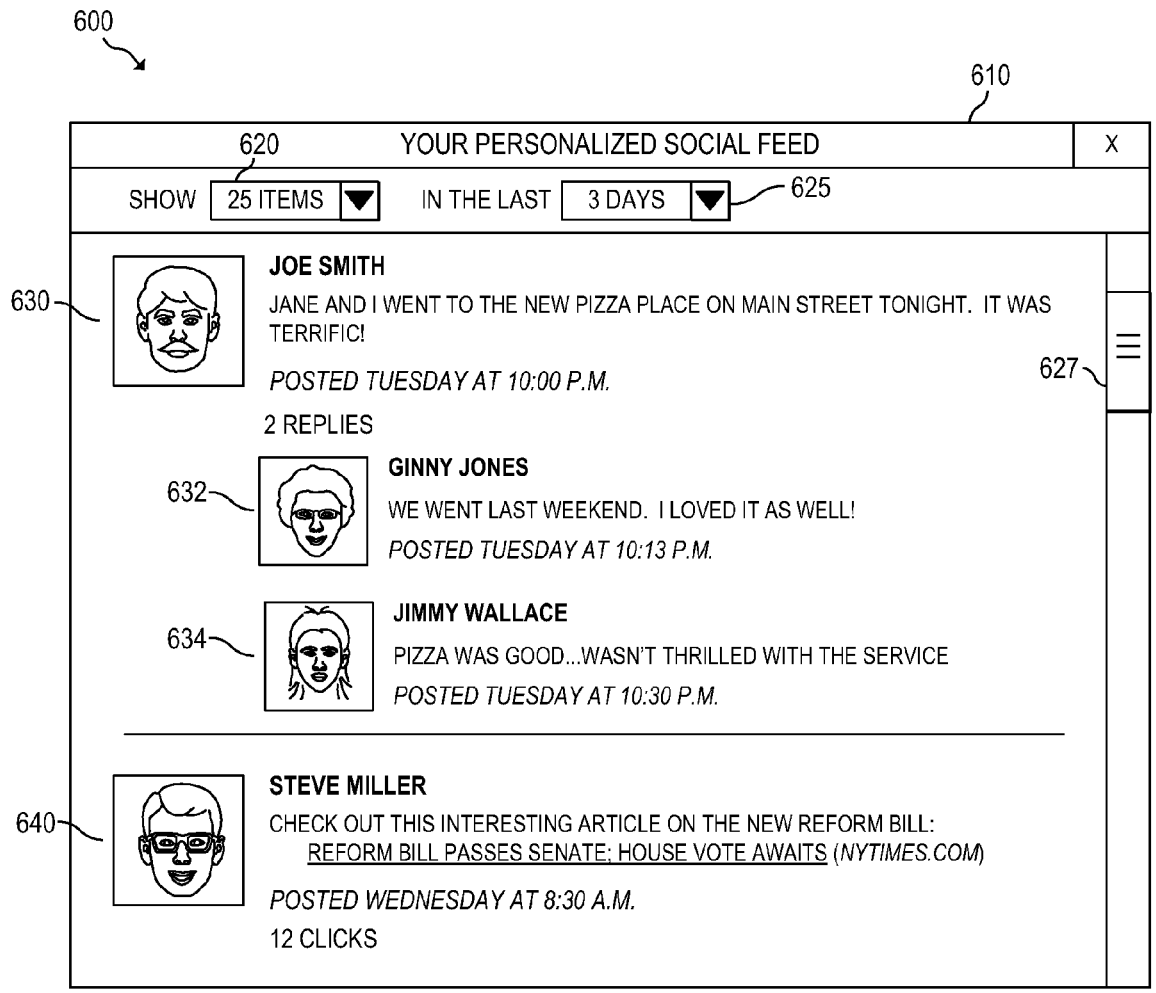
FIG. 6 is a schematic diagram of an example user interface for displaying a subset of a specified number of feed items posted within a specified time period that are most likely to be of interest to a particular user.

FIG. 6 is a schematic diagram of an example user interface 600 for displaying a subset of a specified number 620 of social networking items posted within a specified time period 625 that are perceived to be of interest to a particular user. User interface 600 may correspond, for example, to the interface outputted on a user's device upon selection of a subset of items by computing device 100 of FIG. 1 or computing device 200 of FIG. 2. It should be noted that, although described below with reference to a web-based social networking application, interface 600 may be adapted for display of any posted items from any feed of information.

As illustrated, through the use of item number element 620 and time period selection element 625, a user has requested output of the 25 items posted in the last 3 days that are perceived as being most likely to be of interest to the user. Personalized social feed 610 therefore includes a number of posted items 630, 640, each of which was selected based on its local and global values, as described in detail above. In particular, as illustrated, a post 630 by Joe Smith was selected on the basis of endorsements 632, 634 by Ginny Jones and Jimmy Wallace (replies in this case) and the local value of the item to the user. The local value of post 630 may have been determined on the basis of the user's endorsements of posts by Joe Smith in the past (i.e., the author of the item) and/or on the basis of the user's endorsements of social networking status updates (i.e., the source of the item). Similarly, a post 640 by Steve Miller was selected on the basis of 12 endorsements (clicks in this case) of a link to a news article he posted and the local value of the item to the user. The local value of post 630 may have been determined on the basis of the user's endorsements of posts by Steve Miller in the past (i.e., the author of the item) and/or on the basis of the user's endorsements of posts from "Nytimes.com" (i.e., the source of the item). As illustrated by the position of the scroll bar 627 in personalized social feed 610, additional items are available for viewing by the user at a lower position in the window.

According to the foregoing, example implementations disclosed herein process a feed of information to generate a personalized feed that contains items likely to be of interest to a given user. In selecting the items to be included in the subset, example implementations may consider a local value of each item to the user and a global value of each item to a selected group users of the application, considering a number of possible factors in determining these values. In this manner, example implementations may filter items from a feed of information automatically, thereby relieving the user of the burden of sifting through the feed to obtain information that is useful or of interest.

We claim:

1. A machine-readable storage medium encoded with instructions executable by a processor of a computing device, the machine-readable storage medium comprising:
  instructions for accessing a feed of information comprising a plurality of posted items accessible via an application; and
  instructions for selecting, from the feed of information, a subset of items perceived to be of interest to a particular user based on a predicted value of each item to the particular user and a global value of each item to a plurality of users of the application, wherein the instructions for selecting are to:
    determine the predicted value of each item to the particular user based on at least one of a number of past endorsements by the particular user of a source of the item and a number of past endorsements by the particular user of other posts of an author of the item, and
    determine the global value of each item based on a number of endorsements of the item by the plurality of users of the application.

2. The machine-readable storage medium of claim 1, wherein the instructions for selecting further determine the predicted value of each item to the particular user based on at least one of:
  a reputation of a source of the item determined based on an expected number of endorsements of the source compared to an actual number of endorsements by the particular user, and
  a reputation of an author of the item determined based on an expected number of endorsements of posts of the author compared to an actual number of endorsements by the particular user.

3. The machine-readable storage medium of claim 1, wherein the instructions for selecting determine the global value of each item further based on at least one of:
  a number of past endorsements by the plurality of users of the application of a source of the item, and
  a number of past endorsements by the plurality of users of the application of other posts of an author of the item.

4. The machine-readable storage medium of claim 1, wherein the instructions for selecting further determine the global value of each item based on at least one of:
  a reputation of a source of the item determined based on an expected number of endorsements of the source compared to an actual number of endorsements by the plurality of users of the application, and
  a reputation of an author of the item determined based on an expected number of endorsements of posts of the author compared to an actual number of endorsements by the plurality of users of the application.

5. The machine-readable storage medium of claim 1, wherein:

each item is associated with a particular time of posting, and the instructions for selecting select the subset of items to include a predetermined number of items for which the particular time of posting is within a predetermined time window prior to a current time.

6. A computing device comprising:

a processor; and a machine-readable storage medium encoded with instructions executable by the processor, the machine-readable storage medium comprising:

instructions for accessing a plurality of posted items included in a feed of information, and instructions for selecting, from the plurality of items, a subset of items perceived to be of interest to a particular user based on a predicted value of each item, wherein the predicted value of each item is based on:

a level of attention by a plurality of users to the item, a level of attention by the plurality of users to at least one of an author of the item and a source of the item, and a level of attention by the particular user to at least one of the author of the item and the source of the item, wherein the instructions for selecting determine each level of attention based on a number of endorsements of the item and each endorsement is selected from a group consisting of a selection of the item, a reply to the item, a forwarding of the item, a quoting of the item, and an expression of approval of the item.

7. The computing device of claim 6, wherein:

the plurality of users is a group of trusted peers of the particular user, and the instructions for selecting determine the level of attention by the plurality of users to each item based on a number of endorsements of the item by the group of trusted peers of the particular user.

8. The computing device of claim 6, wherein:

each endorsement is weighted according to a predetermined level of effort assigned to each type of endorsement.

9. The computing device of claim 6, wherein:

each item is associated with a time of posting, and the instructions for selecting select the subset of items from among posted items with a time of posting during a specified time window.

10. The computing device of claim 6, wherein the instructions for selecting calculate the predicted value of each item as a linear combination of each level of attention.

11. A method comprising:

receiving, in a computing device, an indication to select, from a plurality of posted items accessible via an application, a subset of items posted within a specified time period that are perceived to be of interest to a particular user;

accessing a feed of information including the plurality of posted items, wherein each item in the feed of information is associated with a time of posting; and selecting the subset of items perceived to be of interest to the particular user based on a predicted value of each item to the particular user, a global value of each item to a plurality of users of the application, and the time of posting of each item being within the specified time period, wherein the selecting comprises:

determining the predicted value of each item to the particular user based on at least one of a number of past endorsements by the particular user of a source of the item and a number of past endorsements by the particular user of other posts of an author of the item, and determining the global value of each item based on a number of endorsements of the item by the plurality of users of the application.

12. The method of claim 11, further comprising:

determining the predicted value of each item to the particular user further based on at least one of:

a reputation of a source of the item determined based on an expected number of endorsements of the source compared to an actual number of endorsements by the particular user, and a reputation of an author of the item determined based on an expected number of endorsements of posts of the author compared to an actual number of endorsements by the particular user.

13. The method of claim 11, further comprising:

determining the global value of each item further based on at least one of:

a reputation of a source of the item determined based on an expected number of endorsements of the source compared to an actual number of endorsements by the plurality of users of the application, and a reputation of an author of the item determined based on an expected number of endorsements of posts of the author compared to an actual number of endorsements by the plurality of users of the application.

14. The method of claim 11, further comprising:

combining a group of items to generate a single item when a particular item likely to be of interest to the particular user is associated with one or more child items.

15. The method of claim 11, wherein:

each item is associated with an author, and the method further comprises filtering the selected subset of items to include no more than a predetermined number of items for each author.

16. The method of claim 11, further comprising:

ordering the subset of items most likely to be of interest to the particular user in forward-chronological order based on the time of posting of each item.

17. The method of claim 11, wherein the specified time period is one of:

a time period since a last access of the feed of information by the particular user, and a time period specified by the particular user.

* * * * *